(12) United States Patent
Magen

(10) Patent No.: US 11,002,611 B2
(45) Date of Patent: May 11, 2021

(54) ELAPSED TIME TEMPERATURE INDICATOR AND METHOD OF ACTIVATION AND USE

(71) Applicant: Timestrip UK Limited, Suffolk (GB)

(72) Inventor: Erez Magen, Rehovot (IL)

(73) Assignee: Timestrip UK Limited, Suffolk (GB)

( * ) Notice: Subject to any disclaimer, the term of this patent is extended or adjusted under 35 U.S.C. 154(b) by 347 days.

(21) Appl. No.: 16/260,245

(22) Filed: Jan. 29, 2019

(65) Prior Publication Data

US 2019/0234806 A1 Aug. 1, 2019

(30) Foreign Application Priority Data

Jan. 29, 2018 (GB) ...................................... 1801413

(51) Int. Cl.
*G01K 13/04* (2006.01)
*G01K 3/04* (2006.01)
(Continued)

(52) U.S. Cl.
CPC .......... *G01K 3/04* (2013.01); *B01L 3/502738* (2013.01); *G01K 1/02* (2013.01);
(Continued)

(58) Field of Classification Search
CPC . G01K 3/04; G01K 3/00; G01K 11/12; G01K 1/14; G01K 2217/00; G01N 31/229; G01N 31/22
(Continued)

(56) References Cited

U.S. PATENT DOCUMENTS 3,420,205 A 1/1969 Morison
3,520,124 A 7/1970 Myers
(Continued)

FOREIGN PATENT DOCUMENTS

CA 2736940 A1 4/2009
CN 104501994 A 4/2015
(Continued)

OTHER PUBLICATIONS

UK Search Report dated Mar. 23, 2018, pertaining to Application No. GB1801413.4 filed Jan. 29, 2018.
(Continued)

*Primary Examiner* — Gail Kaplan Verbitsky
(74) *Attorney, Agent, or Firm* — Dinsmore & Shohl, LLP

(57) ABSTRACT

A time temperature indicator for measuring elapsed time after reaching a threshold temperature includes a reservoir containing an indicator fluid that may be solid below the threshold temperature and that liquefies above the threshold temperature. Activation enables a flow of liquid from the reservoir to reach a migration medium so that when the temperature of the indicator exceeds the threshold temperature after activation liquid migrates through the migration medium producing a colour change therein. A narrow passage is foldable along and parallel to a longitudinal axis thereof so as to form a barrier to liquid migration when the passage is folded while permitting liquid migration through the passage when the passage is unfolded. A micro-fluid valve may be likewise constructed for regulating a flow of liquid between an inlet and an outlet coupled by a narrow passage foldable along and parallel to a longitudinal axis thereof.

16 Claims, 2 Drawing Sheets

(51) Int. Cl.
*G01K 11/06* (2006.01)
*B01L 3/00* (2006.01)
*G01K 1/02* (2021.01)
*G01K 11/12* (2021.01)
*G01N 31/22* (2006.01)

(52) U.S. Cl.
CPC .............. *G01K 11/06* (2013.01); *G01K 11/12* (2013.01); *G01N 31/229* (2013.01)

(58) Field of Classification Search
USPC .................. 374/100–106, 160–162; 116/216
See application file for complete search history.

(56) References Cited

U.S. PATENT DOCUMENTS

| | | | |
|---|---|---|---|
| 3,962,920 A | 6/1976 | Manske | |
| 4,195,056 A | 3/1980 | Patel | |
| 5,120,137 A * | 6/1992 | Ou-Yang | G01K 3/04 116/219 |
| 6,042,264 A * | 3/2000 | Prusik | G01K 3/04 116/219 |
| 6,741,523 B1 * | 5/2004 | Bommarito | G01K 3/04 116/220 |
| 6,916,116 B2 * | 7/2005 | Diekmann | G01K 3/04 116/216 |
| 7,232,253 B2 | 6/2007 | Isbitsky et al. | |
| 7,290,925 B1 | 11/2007 | Skjervold et al. | |
| 8,104,949 B2 | 1/2012 | Robinson et al. | |
| 8,695,528 B2 * | 4/2014 | Boyaci | G01K 3/04 116/216 |
| 8,800,472 B2 * | 8/2014 | Park | G01K 3/04 116/219 |
| 2005/0005839 A1 | 1/2005 | Moule et al. | |
| 2007/0245947 A1 | 10/2007 | Riemelmoser | |
| 2008/0056329 A1 * | 3/2008 | Smith | G01K 11/06 374/106 |
| 2008/0184927 A1 * | 8/2008 | Pham | G01K 11/12 116/207 |
| 2012/0079981 A1 | 4/2012 | Huffman et al. | |
| 2012/0236900 A1 | 9/2012 | Hubbard et al. | |
| 2013/0287059 A1 * | 10/2013 | Selman | G01K 3/04 374/104 |
| 2014/0119402 A1 * | 5/2014 | Deng | B32B 37/02 374/102 |
| 2019/0257695 A1 * | 8/2019 | Salman | G01K 3/04 |

FOREIGN PATENT DOCUMENTS

| | | |
|---|---|---|
| CN | 106568527 A | 4/2017 |
| CN | 206348084 U | 7/2017 |
| EP | 0193393 A2 | 9/1986 |
| EP | 0545274 A1 | 6/1993 |
| EP | 0741285 A2 | 11/1996 |
| FR | 2684446 A1 | 6/1993 |
| WO | 03084450 A2 | 10/2003 |
| WO | 2014150186 A1 | 9/2014 |

OTHER PUBLICATIONS

Extended European Search Report dated Jun. 13, 2019, pertaining to Application No. EP19151687.1.

* cited by examiner

ELAPSED TIME TEMPERATURE INDICATOR AND METHOD OF ACTIVATION AND USE

RELATED APPLICATION

This application claims priority from United Kingdom Patent Application No. GB 1801413.4, filed Jan. 29, 2018.

TECHNICAL FIELD

The present invention relates generally to a microfluidic valve and more particularly for use of such a valve as activation means for a time temperature indicator.

BACKGROUND

Time temperature indicators are devices or smart labels that show accumulated time-temperature history of a product and are commonly used on food, pharmaceutical, and medical products to indicate exposure to excessive temperature and time at temperature.

In essence these devices are stop watches that measure elapsed time after being initiated or activated. There is a vast literature relating to time indicators and time-temperature indicators but it appears that devices fall into essentially three categories. There are those such as disclosed in U.S. Pat. No. 3,520,124 where activation is achieved by peeling away a release sheet between two reactant sheets, thereby effecting contact between the two sheets and initiating a reaction which extends over a selected time interval and terminates with a color change of the device. The same approach is very often realized using a reservoir to store liquid that, when released, is absorbed by a migrating medium often referred to as a wick, the progress of the migration serving to provide an indication of elapsed time. Examples of such an approach are disclosed in U.S. Pat. Nos. 3,962,920 and 5,120,137.

Some devices have two or even more reservoirs, which may store different liquid reactants that mix when the device is activated and produce a colour change that indicates the passage of time as the liquid mix progresses through the migrating medium. Examples of this approach are to be found in WO 2003/084450, CA 2,736,940 and U.S. Pat. No. 7,232,253.

In many applications it is a disadvantage to remove a barrier strip to activate the device. For one thing, barrier strips usually mandate an elongated device and must have a protruding tab by means of which the release layer may be gripped. The prior art addresses the need to activate the device without the need for a barrier strip or release layer that must be mechanically peeled away by the user.

The above approaches are common to both time and time temperature devices, since both types need to be activated in order to set the start time. However, time temperature devices need to start measuring elapsed time only when the temperature exceeds a specified threshold. This requirement is also met in different ways.

Most simple are self-activating devices such as described in US 2007/0245947, wherein a reservoir stores indicating material that is solid below a threshold temperature and becomes liquid at or above this threshold temperature. A wick is arranged with respect to the reservoir and a barrier located on the wick prevents viewing of the migration of the indicating material through the wick until it migrates past the barrier region. The indicator is activated by heat alone, which requires that during the manufacturing process, the various layers must be maintained below the predetermined temperature so as to maintain the indicating material solid. Once the temperature of an object to which the device is attached exceeds the threshold, the liquid melts and starts to migrate through the wick. But the progress will remain invisible until the liquid spreads beyond the barrier.

US 2012/0079981 is another example of a self-activating time-temperature indicator, which requires no user or other intervention to initiate recording of cumulative ambient temperature exposure.

Devices that are activated by temperature alone suffer from the major drawback that the device must be manufactured and delivered at a temperature below the threshold temperature at which the solidified indicator fluid melts. This renders such devices impractical for purposes where the indicator fluid is liquid at conventional ambient temperatures. It is therefore common practice to require that the device first be triggered or activated prior to use in order to rupture a barrier between the reservoir and the migrating medium. This way, the device can be manufactured and delivered with the indicator fluid in liquid state.

Products for which such devices are used are stored at lower temperatures than the threshold temperature, the device being used to indicate the elapsed time after the product is removed from the safe low temperature environment and has warmed up beyond the threshold temperature. Typically, the storage temperature is below the freezing point of the indicator fluid, which thus solidifies. In order to activate the device, it is then necessary to transfer the product to an environment where the temperature is higher than the melting point of the indicator fluid, which thus melts. The seal may then be ruptured to commence migration of the liquid after which the product may be cooled to re-solidify the indicator fluid. When the product is subsequently removed from cold storage and reaches the threshold temperature, the indicator fluid melts and since the device is already activated the now liquid indicator fluid migrates and serves to indicate lapsed time.

U.S. Pat. No. 7,232,253 discloses a time indicator comprising a first reservoir, a migration medium and activating means for bringing indicator fluid in liquid form from a reservoir in contact with the migration medium so that after activation the liquid migrates through the migration medium producing a colour change therein. In one embodiment, the reservoir comprises a dished portion in a base layer which forms a button or blister. When pressure is applied to the blister, it ruptures a weak seal allowing liquid in the reservoir to reach the migration medium.

We will refer to devices of this kind as "blister-type" devices as distinct from those devices where activation is achieved by peeling away a release layer.

The device described in U.S. Pat. No. 7,232,253 is not temperature-dependent and assumes that the device is operative immediately following activation. A typical use of time indicators is to ensure that a tagged product is used only during a defined period of time after activation. For this reason, an indicator fluid may be selected that is in liquid state for all contemplated temperatures of use and storage. Activation merely requires that the blister be ruptured so as to release the indicator liquid. After activation the liquid travels relatively rapidly from the first reservoir to a second reservoir connected between the first reservoir and the migration medium and then migrates relatively slowly along the length of the migration medium over time. This device therefore requires two reservoirs. The second reservoir allows for rapid dispersion of the liquid away from the first reservoir, which may reduce the risk of the device leaking when the liquid is forced out of the first reservoir. It is further suggested that the accuracy of the measurement of elapsed time may be improved since the measurement depends only on the nature of the migration medium and liquid and is independent of the initial flow of the liquid from the first reservoir.

FR 2 684 446 discloses a device for monitoring whether or not a cold or frozen product is safe for consumption. A sachet or reservoir of the device has two cavities separated by an internal partition formed by one or more capillaries, so as to ensure communication between the two cavities when the device is activated. Prior to activation, indication liquid stored in the first cavity is prevented from migrating to the second cavity by bending the capillaries along a line parallel to the partition. This device thus has two reservoirs, neither of which is a blister pack and does not address the problem of storage at a temperature where the indicator liquid solidifies.

When blister-type indicators are used with products, which are stored at lower temperatures than the melting point of the liquid reactant, it is not possible for the end-user to activate the device immediately prior to use on removing the device from storage. The reason for this is that activation requires rupturing the seal by pressing on the blister and this cannot be done while the reactant stored within the blister is a solid incompressible mass. Activation by the end-user requires that the device be removed from storage and removed to a sufficiently warm environment where the solid reactant melts.

There are several disadvantages with such an approach. Principally is the fact that activation and use are separated in time and require two independent actions on the part of the user. This is because the device as shipped is inactive and must be activated prior to use. If the indicator fluid were to remain in its liquid state also when stored, this would not be a problem: the user would remove the article from storage, activate the device and the liquid would immediately commence its migration. But once the liquid solidifies in a blister-type indicator this cannot be done until it melts and it may be inconvenient for the user to find a heat source or remove the device to a warmer environment before activating the device. A second drawback is that when the device is activated prior to use, some slight migration of the indicator fluid from the reservoir into the migration layer is inevitable, which means that activation causes the time lapse measurement to start during the small time interval after activation and prior to the indicator fluid solidifying in cold storage.

It would therefore be desirable if the time indicator could be shipped in an activated state, thus avoiding the need for user-initiated activation prior to actual use. It would also be preferable that this be done in a manner that prevented even momentary and limited time-elapse measurement prior to use.

These drawbacks do not apply to devices having a release layer that is peeled away before use since, even when such devices use liquid reactants that freeze at low storage temperatures prior to use, solidification of the reactant does not prevent the release sheet from being removed. Furthermore, since the solidified liquid reactant will react only when it melts, the device will correctly record the actual elapsed time after the reactant reaches the threshold temperature. However, as noted previously, such devices tend to be elongated and must have a protruding tab by means of which the release layer may be gripped.

U.S. Pat. No. 6,916,116 discloses a time-temperature device that indicates progress of a fluid as it moves through channels of a substrate. At low temperatures, the fluid can be a solid that liquefies at temperatures of actual usage so as to track usage time of products that degrade only above a critical threshold temperature. But in order to prevent migration prior to actual use, such a device still requires activation.

WO/2014/150186 discloses a time indicating label that is activated by bending the label thereby lifting a release liner away from an activation layer and allowing the activating agent to migrate through a timing layer.

EP 0 193 393 discloses a critical temperature or time interval indicator which is activated by folding along a fold line whereupon a coloured liquid migrates into an absorbent wick. The liquid and the wick are disposed on opposite sides of the fold line so as to prevent activation prior to activation.

The present invention relates only to blister-type devices where the indicator fluid solidifies or is liable to solidify during storage and therefore must be activated prior to storage.

US 2012/0236900 discloses a time-temperature blister-type indicator comprising a single liquid reservoir, a wick and an activation trigger. If the indicator fluid freezes during storage, there is no free liquid to diffuse along the wick and the device indicates the time-temperature history from the point of initial activation but only at temperatures above a Critical Reference Temperature. This is, in fact, not the preferred mode of operation of the device, which preferably uses an indicator fluid that is liquid at all temperatures likely to be encountered during the storage of the product. In such case, of course, there is no problem in activating the device immediately prior to use.

US 2012/0236900 is relevant to our discussion because it is a blister-type device having only a single reservoir and it can be used with an indicator fluid that solidifies during storage and therefore must be activated prior to storage. The conventional and currently, so far as is known, the only way to activate such a device is to elevate the temperature to the point where the indicator fluid liquefies. This is subject to the problems which have already been discussed.

Furthermore, triggering of the device disclosed in US 2012/0236900 requires that the ink based barrier be ruptured in ordered to allow the flow of indicator liquid from the reservoir through the perforations in the intermediate polyethylene film. It is not completely clear how this is achieved, but presumably it is the result of depressing the blister. This cannot be done if the indicator fluid is solid although this is not a factor if the device is used with a material that remains liquid at all temperatures likely to be encountered during the storage of the product.

For the sake of completeness, U.S. Pat. No. 4,195,056 discloses a time-temperature indicator having a vapour-permeable barrier positioned between a vapour and a solid indicator, both housed in a vapour-impermeable container. The device is activated just prior to the monitoring period by providing vapour to the container, as for example, by rupturing a solvent-filled frangible reservoir.

CN 206348084 discloses an indicating device comprising an indicating layer provided with an activating portion and an observation portion surrounding the starting portion; a base layer for carrying the indicating layer, and the observation portion and the detecting layer. The base layer is sealed and connected, a storage chamber is formed between the starting portion and the base layer, an indicating unit is provided in the storage chamber, and the indicating unit includes an adsorption body and is adsorbed in the adsorption body. A phase change indicator material has a liquid phase channel, one end of which communicates with the storage chamber, and the other end of which connects with the observation portion.

CN 106568527 discloses an indicating device, wherein a storage chamber is formed between a start part of an indicating layer and a base layer, and an indicating unit is arranged in the storage chamber. The indicating unit comprises an adsorption body and a phase change indicating material adsorbed in the adsorption body. In the activation process, it is only needed to press the outer wall of the storage chamber or directly press the start part, then the adsorption body is extruded, and the phase change indicating material is separated from the adsorption body and enters a microporous sandwich layer through a liquid phase channel to indicate temperature changes.

It would be desirable to provide an alternative activation means suitable for use with blister type time temperature indicators using indicator fluid that solidifies when the product to which it is attached is stored, which avoids heating the device above the threshold temperature in order to melt the solidified indicator fluid and allow compressing the blister by the end-user.

SUMMARY

It is therefore a principal object of the invention to provide a time temperature indicator and method of activation, which address the above requirements.

The present invention is directed to a blister-type time-temperature indicator having a reservoir that contains indicator fluid that solidifies when the product to which it is attached is stored, but which liquefies when removed from cold storage prior to use. The invention is principally directed to the manner in which such a device may be activated prior to cold storage when the indicator fluid is in its liquid state. Although the invention is described with particular reference to blister-type devices, the invention relates in general to devices having a rupturable reservoir that is ruptured in order to release the indicator fluid contained therein. The reservoir may be a blister or a shallow pocket having a weak seal that is ruptured when moderate finger pressure is applied to the reservoir.

This object is realized in accordance with the invention by a time temperature indicator and method of use having the features of the respective independent claims.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

The following description relates only to those constructional features that are relevant to the invention. Other details are the same or similar to those as described in commonly assigned U.S. Pat. No. 7,232,253 to which reference may be made.

Figure 1:
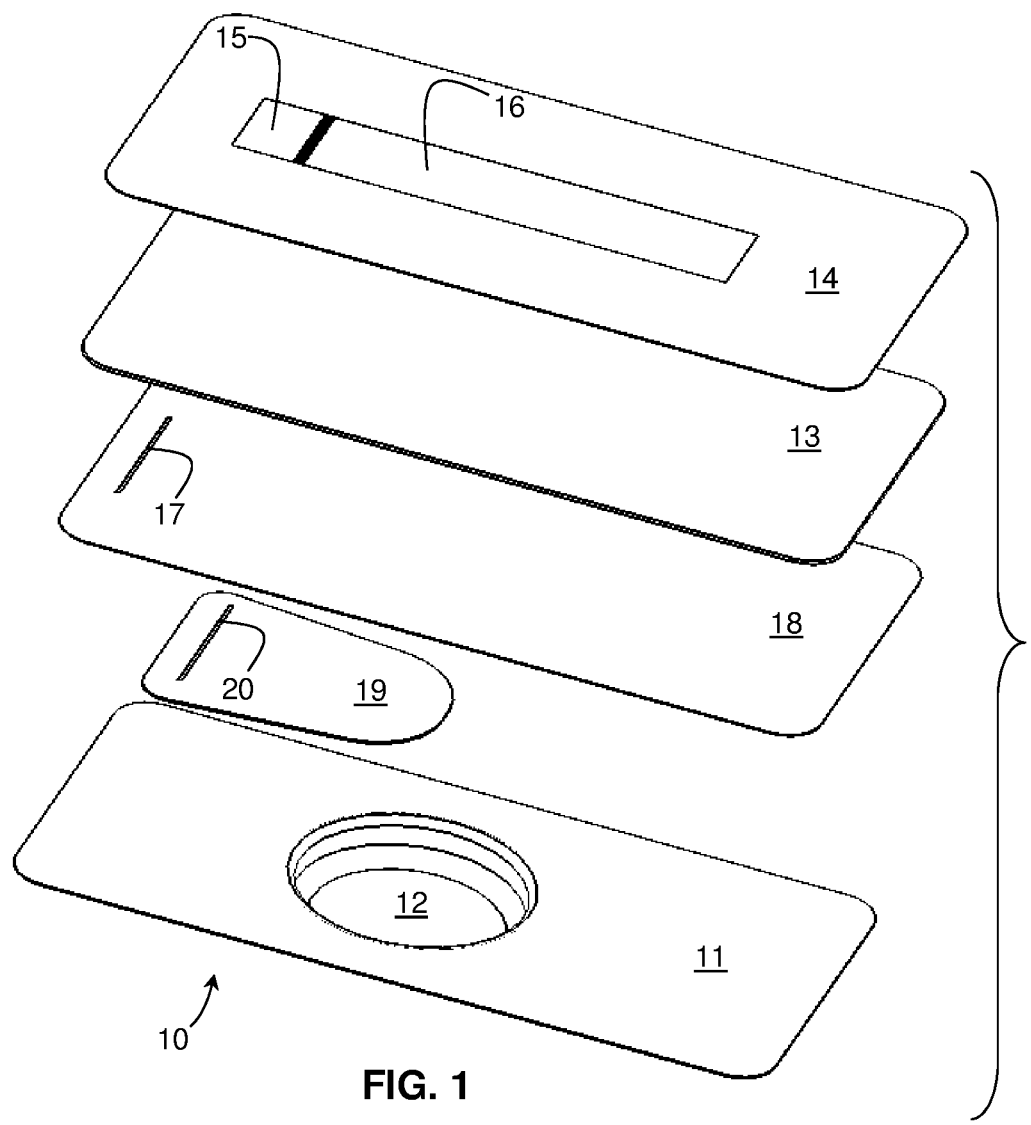
FIG. 1 is an exploded view showing pictorially a time temperature indicator according to an embodiment of the invention.
Figure 2:
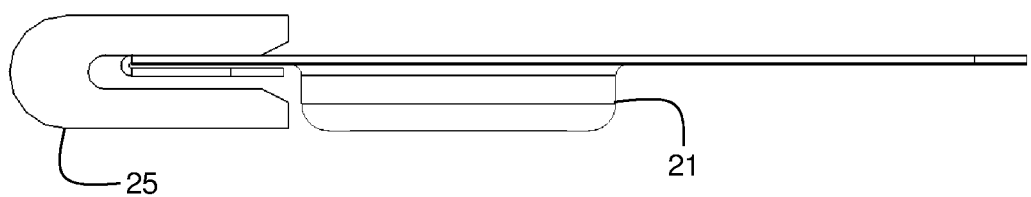
FIG. 2 is a side elevation showing the device after activation and prior to use.

FIGS. 1 and 2 show a time temperature indicator 10 according to one embodiment of the invention. The device comprises a base layer 11, which may be formed of aluminium or plastic sheet containing a reservoir 12 containing an indicator fluid, a central layer 13 that constitutes an intermediate layer comprising a migration medium, and a partially transparent upper layer 14 which is printed on its exposed surface so as to define first and second windows 15, 16 and to provide a suitable scale by which progress of the liquid through the migration medium may be quantified. The first window 15 is a narrow slot proximate a narrow passage 17 through which liquid in the reservoir 12 reaches the central layer 13 when the device is activated and thus provides an immediate visual indication that the device is activated. The second window 16 is elongated and provides a visual indication of the progress of the liquid through the migration medium. In order to prevent liquid reaching the migration medium until the device is activated, a lower surface of the central layer 13 is protected by a plastic laminate 18 except for the narrow passage 17 and a release layer 19 intermediate the plastic laminate 18 and the reservoir 12 serves as a weak seal that at least partially overlaps the reservoir 12. The release layer 19 may be formed of an inert material that is only weakly bonded to the base layer 11. In one embodiment, the release layer 19 is strongly laminated to the plastic laminate 18 while the base layer 11 is strongly laminated to the plastic laminate 18 other than within the contour of the release layer 19. In this case, the only way for liquid to penetrate through to the central layer 13 is through the slot 20, which is exposed to liquid only when the weak seal between the release layer 19 and the base layer 11 is ruptured. An alternative embodiment avoids the need for the release layer 19 as a discrete physical layer but applies only weak lamination between the base layer 11 and the plastic laminate 18 within an intermediate area of the base layer overlapping the reservoir 12 so that pressing the blister ruptures the weak lamination. In practice this may be achieved by laminating the base layer 11 to the plastic laminate 18 using a pair of plates through which heat is applied and one of which proximate the base layer 11 has an aperture corresponding to the circumference of the reservoir and a recess that may be of similar shape to the release layer 19 and intersects the aperture. When heat and pressure are applied to the two plates, neither heat nor pressure will be applied in the area of the reservoir or of the recess, such that in these areas there will be no bonding between the two layers. On the other hand, the surrounding areas of both the base layer 11 and the plastic laminate 18 will be strongly laminated thereby forming between the two layers a pocket or channel that connects the reservoir to the narrow passage 17. This can also be done using heated rollers to melt glue extruded onto lamination film, which is in turn applied to a substrate such as paper or card using pressure rollers. If one of the pressure rollers has a slight indent or recess, the area of the lamination film overlaying the indent or recess will not be pressed sufficiently against the substrate and the resulting bond will be weak.

The narrow passage 17 may be a score line formed by scoring through the plastic laminate 18. A similar passage 20 is likewise cut through the release layer 19 and during assembly of the device is maintained in exact registration with the narrow passage 17. As is explained below with reference to FIGS. 3a and 3b, folding the device along the score line or between the reservoir and the score line seals the passage 17 and prevents indicator fluid penetrating through the passage to the migration medium in the central layer 13. One way to achieve the required registration is first to bond the release layer 19 to the plastic laminate 18 and then score through both layers taking care not to fully penetrate the central layer 13, although partial penetration is permissible since in any case liquid cannot penetrate through the slot until the seal is first ruptured. In embodiments without the release layer 19, no registration is required and the slot 17 can be cut in the plastic laminate 18 prior to assembly. The scoring can be done with a sharp blade or using other means know per se.

The base layer 11 constitutes a lower seal for the indicator as a whole. The base layer 11 comprises a dished portion 21 which forms a button or blister and contains the reservoir 12 which serves to drive the liquid-migration mechanism. The dished portion 21 may be thermoformed. The underside of the base layer 11 may be an adhesive surface serving to attach the indicator to the item being monitored. The upper surface of the base layer 11 is strongly laminated to the plastic laminate 18 except for the area of the release layer 19. Upon depressing the button formed by dished portion 21, liquid is forced out of the reservoir 12 and the resulting pressure ruptures the weak seal formed by the release layer 19, which detaches from the base layer 11. The liquid in contact with the plastic laminate 18, which is impervious to the liquid, now reaches the narrow passage 17, through which the liquid seeps into the migration medium constituted by the central layer 13. Upon doing so, it immediately starts to wet the migration layer and spread just as a blob of ink will spread circularly on a piece of blotting paper and fills the first window 15 proximate the passage 17 thus providing immediate visual feedback that the device is activated. The liquid continues to spread through the migration medium at a rate that depends on the properties of the migration medium and the liquid thereby gradually progressing along the second window 16. Of course, in doing so it spreads also along the sides of the elongated second window 16 but the sideways spread is not seen because the upper layer 14 is opaque other than for the two transparent windows 15 and 16.

Figure 3A:
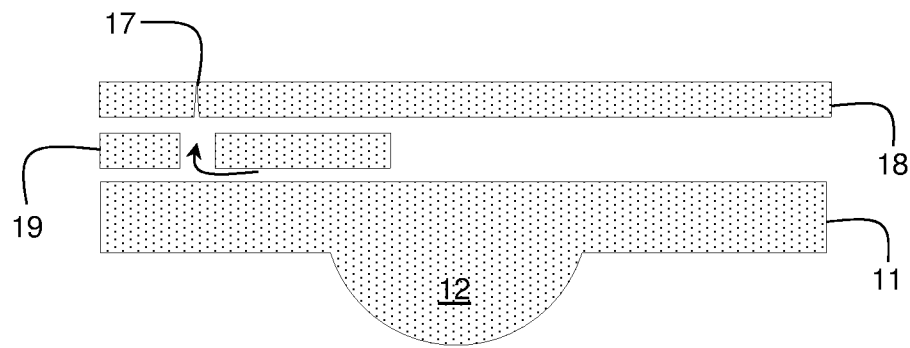
FIGS. 3a and 3b show schematically a detail of a narrow passage that is folded along and parallel to a longitudinal axis thereof to block fluid flow therethrough.
Figure 3B:

FIG. 3a shows schematically a detail of the device according to the first embodiment prior to folding along the score line that forms the passage 17 in the plastic laminate 18. The direction of liquid flow from the reservoir 12 through the score line in the release layer 19 is depicted by the arrow. FIG. 3b shows schematically the plastic laminate 18 folded along the score line, it being seen that the opening to the passage 17 forms a sharp corner which prevents the inlet of fluid. For the sake of simplicity, the other layers in the device are not shown in FIG. 3b since they play no part in the sealing of the passage 17. It will be understood that folding the plastic laminate 18 along the score line seals the passage 17 because the passage fluidly connects between two adjacent layers whereby in the unfolded state, liquid below the lower layer penetrates the lower layer through the passage and reaches the upper layer, which is the migrating medium. Therefore, if the passage is axially folded in either direction, the fold line acts as a wall that prevents liquid flow from one layer to the other. However, it will be appreciated that the same effect can be realized by folding the device along a line between the reservoir and the passage so as to form an internal wall between the two layers that prevents liquid flow from one layer to the other.

Having described the structure of the device according to various embodiments, we now explain how it solves the problem of activation when the indicator fluid in the reservoir 12 solidifies prior to activation. In all cases, we are concerned with monitoring breach of temperature above a threshold temperature below which the indicator fluid solidifies and above which it liquefies. We will first discuss the embodiment as shown in FIG. 1. For so long as the temperature of the device does not exceed the threshold temperature, the indicator fluid is solid and cannot reach the migration medium in the central layer 13. But when the device 10 reaches the melting point of the indicator fluid, we do want the liquefied indicator fluid to penetrate the passage 17 and commence its migration through the central layer 13. This may be done by activating the device during manufacture at a temperature that exceeds the temperature threshold by applying pressure to the blister so as to break the seal formed by the release layer 19. This can be done either before or after folding the device.

In the case where the device activated before folding, liquid quickly penetrates the passage 17 into the first window 15 and provides an immediate visual indication that the device is activated. The device is now folded along the passage 20 or between the reservoir 12 and the passage 20 and is retained in its folded state by means of a clip 25 shown in FIG. 2 placed over the folded end of the device. The clip 25 thus constitutes a retaining element for retaining the device in its folded state prior to use. However, it will be appreciated that the same effect can be realized in other ways such as, for example, binding the folded end with removal adhesive tape or a rubber band. Because the passages 17 and 20 are in precise registration, folding along the score line constituting the passage 20 has the effect of folding both passages along and parallel to their longitudinal axis. Since the passages are very narrow this completely seals both passages and prevents seepage of liquid therethrough to the migration medium in the central layer 13. However, the same result will be achieved by folding the device between the reservoir 12 and the passage 20 since liquid in the reservoir will be prevented by the fold from reaching the passage 20. If the device is intended for use with a product that is used above room temperature, the indicator fluid will solidify prior to shipping but the device will nevertheless be activated.

The end-user attaches the device to a product prior to storage at a temperature that is below the threshold. The end-user can see that the device is activated because some of the indicator fluid already migrated into the first window 15 when the manufacturer activated the device. When the product is ready for use and removed from storage, the clip 25 is removed by the end-user and the device unfolded. When the temperature rises above the melting point of the indicator fluid, the liquefied fluid commences its migration through the passage 17, thereby providing a visual indication of elapsed time after the threshold temperature is breached. However, the end-user has no way of knowing that the threshold temperature was breached until the indicator fluid progresses sufficiently through the second window 16. The rate at which this happens depends on multiple factors such as fluid viscosity, the type of migration medium and so on, which determine the maximum allowable time that the product may continue to be used after the threshold temperature is breached. In other words, if the device is used with a product that can be used for a maximum of four hours after the threshold temperature is breached, the length of the second window 16 and the corresponding scale must be calibrated to show progress of the indicator fluid for at least this amount of time and typically slightly longer. If the device is used with a product that can be safely used three days after temperature breach, the scale will need to accommodate a correspondingly longer elapsed time period. So the rate at which the indicator fluid is allowed to migrate through the second window 16 is a function of the maximum allowable time of usage after the temperature threshold is breached. This means that progress of the indicator fluid through the second window 16 may be quite slow and it may take 30 minutes or even longer before any noticeable migration is seen.

There may be situations where an end-user needs to know immediately that a critical temperature threshold has been breached. This requirement can also be realized by the invention by activating the device during manufacture after first folding the device. In this case, even though the indicator fluid is liquid when the blister is ruptured, it is unable to penetrate through the passage 17 into the migration medium.

This approach solves both problems described above. First, there is no need for the end-user to heat beyond the threshold temperature before activating the device since it is received in its activated state. Secondly, if during manufacture the device is folded before rupturing the blister and the fold is then secured using the clip 25, the indicator fluid is prevented from penetrating through to the migration medium. The device then serves as a GO-NO GO indicator that provides an immediate indication as soon as the threshold temperature is breached. Thus, when a product to which the device is attached is ready for use, the clip 25 is removed. For so long as the temperature of the device is below the threshold, the first window 15 is blank (typically white) because the clip 25 prevented liquid reaching the migration medium. As soon as the temperature of the device exceeds the threshold, the indicator fluid melts and immediately penetrates the passage 17, whereby the breach is displayed immediately by the first window 15, which changes colour. Consequently, when the product is removed from storage and reaches a temperature when the solidified liquid melts and starts to migrate, liquid migration commences at exactly the same time that the product starts to perish and the elapsed time measured by the device is correct.

The second embodiment described above avoids the need for a release layer 19 by forming between the base layer 11 and the plastic laminate 18 a pocket or channel that connects the reservoir to the narrow passage 17. This embodiment also serves as a GO-NO GO indicator since the device is first folded prior to rupturing the reservoir 12 in order to prevent liquefied indicator fluid flowing through the passage 17 to the migrating medium. When the device is shipped, the first window 15 is blank but as soon as the temperature exceeds the threshold, the colour changes immediately as liquefied indicator fluid penetrates through the passage 17 into the migration medium.

Figure 4:
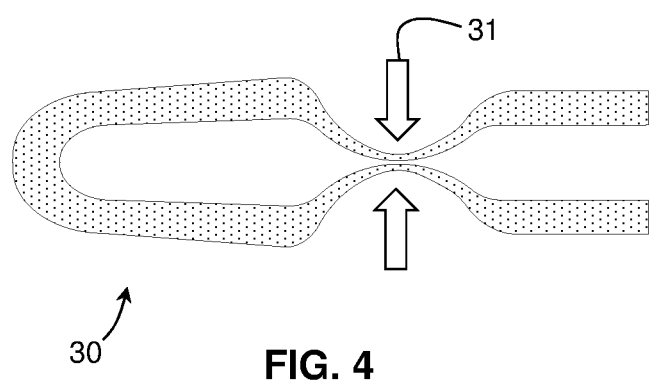
FIG. 4 shows schematically a detail of a tube having a sealed folded end as known in prior art.

FIG. 4 show schematically a detail of a tube 30 having a sealed folded end as known in prior art applications such as irrigation pipes. In this case, the tube is folded at the end about a line that is normal to the longitudinal axis of the tube and is then clamped using a clip 31 so as to squeeze the end of the tube and prevent liquid flow. This approach is also employed in above-mentioned FR 2 684 446, where in effect a capillary connecting two cavities within a common sachet is analogous to a flexible pipe or tube through which liquid is prevented from flowing by bending the tube so as to form two liquid partitions having a common edge that blocks the flow of liquid from one partition to the other.

Also in the device according to the present invention, liquid flow is prevented prior to activation by folding the device. But there are many important differences in the structure, manufacture, activation and use of the two devices. First, structurally the device of FR 2 684 446 is not a layered structure with a reservoir and migrating medium disposed in separate layers, but is a two-reservoir device having a sachet partitioned to form two cavities only a first one of which is filled with liquid. The second cavity contains a reactant that induces a colour change in the liquid when the two interact. During manufacture, the first cavity is bent along a line parallel to a partition between the two cavities before filling with liquid so as to prevent liquid flow to the second cavity via the capillaries connecting the two cavities. So, in fact, it is not the connecting tube that is folded or bent, but rather the first cavity itself which constitutes the reservoir. As best understood, the device and product to be monitored are frozen prior to use, and when the liquid in the first cavity solidifies the device is unfolded thereby activating the device and putting it in a standby state. The liquid in the reservoir cavity remains solidified for so long as the critical temperature is maintained. If this is not i.e. the temperature rises above the melting point, the solidified mass of the reservoir liquefies and migrates through the capillary(s) to the second cavity thereby changing colour. The second cavity thus indicates the state of the product.

Several important conclusions emerge from this discussion. First, the device of FR 2 684 446 is not a time-temperature device since it does not measure elapsed time during which a product has reached or surpassed the critical temperature. Rather, it only provides a GO-NO GO indication that the critical temperature was reached, and it will continue to show this even if the product is subsequently re-frozen. While one embodiment does describe what is translated as a "timer", it is apparent that the French word "temporisateur" is used in the sense of "delay" see http://dictionary.reverso.net/french-english/temporisateur. Indeed the "timer" is merely a labyrinth of capillaries that delays the passage of liquid to the second cavity after the liquid in the first cavity melts. Such a device provides a GO-NO GO indication that the product is now no longer suitable for use, but it cannot provide an ongoing indication of the progress of time after the critical temperature is breached.

Secondly, the device of FR 2 684 446 is really self-activating and responds as soon as the temperature rises above a critical temperature. In the context of the art of time-temperature indicators, activation relates to initiating liquid flow through the migration medium i.e. 'starting the clock' and it is this context that the term is used herein as well as in the annexed claims. But this is the very opposite of what is done in FR 2 684 446, where the device is folded in the factory to de-activate it—since if the indicator fluid is liquid, as it is certainly is during manufacture, then it would flow from the first cavity to the second cavity during manufacture. The first cavity is folded to prevent this from happening. It is true that also in the invention, the device is folded to prevent liquid flow but this is done in addition to activating the device. Until the device according to the invention is activated, no liquid can flow out of the reservoir even if the device is not in its folded state. Therefore while folding serves to prevent liquid flow in both cases, in the invention the folding serves to prevent liquid flow after activation of the device; while in FR 2 684 446 the device is by self-activated by temperature and the folding serves to deactivate it prior to actual use.

Although the invention has been described with regarding to a device having a single blister/pocket, it will be appreciated that the same method of activated may be used with devices having more than one blister or pocket. For example, there may be two blisters or pockets, the first containing liquid/chemical and the second being empty or containing a solid reagent. Flow of liquid from the first reservoir is prevented by folding the device between the two reservoirs and the device is subsequently activated by unfolding the device and rupturing the first reservoir so as to allow the flow of liquid to the second reservoir from which it progresses to the migration medium. It may first be subject to a change in colour by reacting with a reagent in the second reservoir.

Such an approach is easily implemented when the fluid in the first reservoir is solid at room temperature since it is then prevented from reaching the second reservoir during manufacture. In this case, the first reservoir need not be sealed. If, on the other hand, the fluid in the first reservoir is liquid at room temperature it would need to be cooled below its melting point prior to its insertion to the first reservoir, after which the device is folded and clipped so that even after the indicator fluid melts, it cannot reach the second reservoir. The same approach is also applicable when using only single reservoir.

Although the invention has been described with particular reference to a time-temperature indicator, the same principles may be employed in a micro-fluidic valve where a narrow passage or capillary folded exactly along or parallel to its longitudinal axis may serve to prevent liquid flow therethrough.

Thus there may be provided in accordance with another aspect of the invention a micro-fluid valve having a planar substrate and a fluid conduit configured for closing and opening by folding and unfolding the planar substrate.

What is claimed is:

1. A time temperature indicator device for measuring elapsed time after reaching a threshold temperature, formed of
    a planar layered structure and comprising:
    a rupturable reservoir containing
        an indicator material that is solid below the threshold temperature and liquefies above the threshold temperature,
    a base layer containing the reservoir,
    an intermediate layer comprising a migration medium,
    an opaque upper layer disposed on a first surface of the intermediate layer and having a first window and a second window for providing a visual indication of progress of the liquid indicator material through the migration medium; wherein the device further comprises:
    a plastic laminate laminated to an upper surface of the base layer and to a second surface of the intermediate layer, and
    a release layer intermediate the plastic laminate and the reservoir;
    the plastic laminate including a passage for enabling a flow of liquid indicator material from the reservoir to reach the migration medium so that when the temperature of the indicator material exceeds the threshold temperature after activation of the device, liquid indicator material will migrate through the migration medium, producing a visible change therein; the migration medium and the passage being formed in separate layers of said layered structure;
    the release layer operable to serve as a rupturable seal for preventing liquid indicator material in the reservoir from reaching the passage prior to activation, the rupturable seal capable of being ruptured in response to finger pressurisation of the liquid indicator material within the reservoir to dislodge the release layer, initiating flow of the liquid indicator material and thus activating the device;
    the planar layered structure capable of being retained folded so as to form a barrier to liquid indicator material migration, and which can be unfolded so as to permit liquid indicator material migration through the passage prior to use; and
    the device further comprising a removable retaining element for retaining the device folded prior to use.

2. The device according to claim 1, wherein the retaining element is a removable clip for clasping a folded end of the device.

3. The device according to claim 1, wherein
    the release layer is fully contained within said layered structure and at least partially overlaps the reservoir, and
    the reservoir is fluidly decoupled from the passage prior to activation via the release layer.

4. The device according to claim 2, wherein
    the release layer is fully contained within said layered structure and at least partially overlaps the reservoir, and
    the reservoir is fluidly decoupled from the passage prior to activation via the release layer.

5. The device according to claim 1, wherein the passage is a score line in the plastic laminate.

6. The device according to claim 2, wherein the passage is a score line in the plastic laminate.

7. The device according to claim 3, wherein the passage is a score line in the plastic laminate.

8. The device according to claim 1, wherein
    the first window is a slot proximate the passage and
    the second, elongated window provides a visual indication of progress of the liquid indicator material through the migration medium.

9. The device according to claim 2, wherein
    the first window is a slot proximate the passage and
    the second, elongated window provides a visual indication of progress of the liquid indicator material through the migration medium.

10. The device according to claim 3, wherein
    the first window is a slot proximate the passage and
    the second, elongated window provides a visual indication of progress of the liquid indicator material through the migration medium.

11. The device according to claim 4, wherein
    the first window is a slot proximate the passage and
    the second, elongated window provides a visual indication of progress of the liquid indicator material through the migration medium.

12. The device according to claim 1, wherein the release layer is formed of an inert material that is bonded to the base layer sufficiently weakly for the bond to be ruptured when liquid indicator material is forced out of the reservoir in response to finger pressurisation of the liquid indicator material within the reservoir.

13. A method for activating the device according to claim 1 during manufacture, the method comprising:
    folding the planar layered structure downstream of the reservoir to prevent migration of the liquid indicator material through the passage when liquid indicator material flow from the reservoir is initiated, and then
    rupturing the rupturable seal at a temperature that exceeds the threshold temperature so as to allow the liquid indicator material to escape from the reservoir, and clasping a folded end of the device for preventing migration of liquid.

14. The method according to claim 13, wherein the laminate is folded along a longitudinal axis of the passage.

15. The method according to claim 13, including
forming a scored line in the plastic laminate for serving as the passage, and
folding the plastic laminate along the scored line.

16. A method of using a device according to claim 1, to provide an indication that a threshold temperature associated with a product is breached; in which
the planar layered structure is folded so as to form a barrier to liquid indicator material migration; the method comprising:
rupturing the rupturable seal by finger pressurisation of the liquid indicator material within the reservoir to dislodge the release layer, thus activating the device while preventing penetration of the liquid indicator material through the passage into the migration medium owing to the device being folded; and prior to use,
unfolding the device and
attaching the unfolded device to the product and
observing whether the first window is coloured indicative of the threshold temperature having been breached.

* * * * *